March 31, 1931. J. W. GRAY 1,799,013
SHOCK ABSORBER MECHANISM
Filed Oct. 16, 1928 6 Sheets-Sheet 1
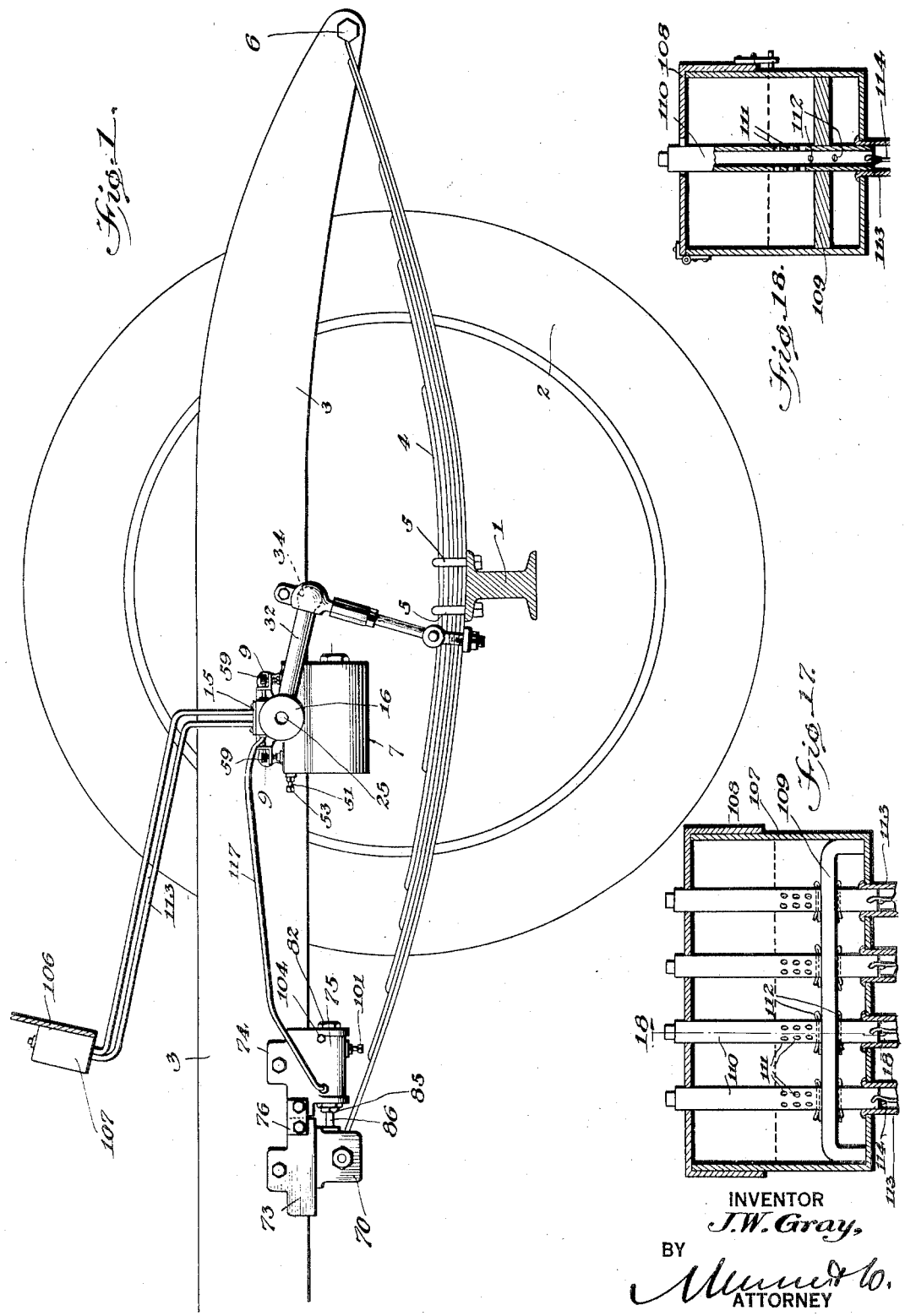
INVENTOR
J. W. Gray,
BY
Munn & Co.
ATTORNEY

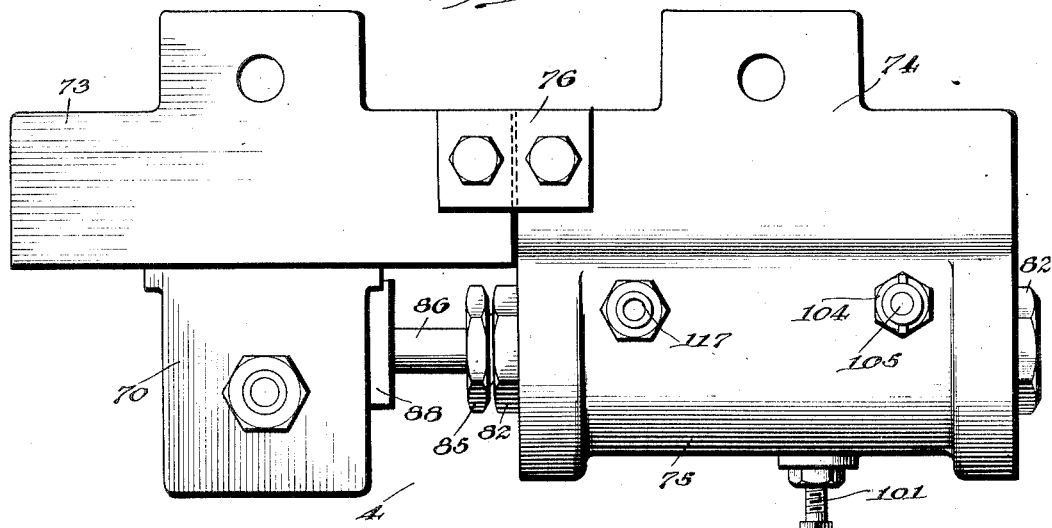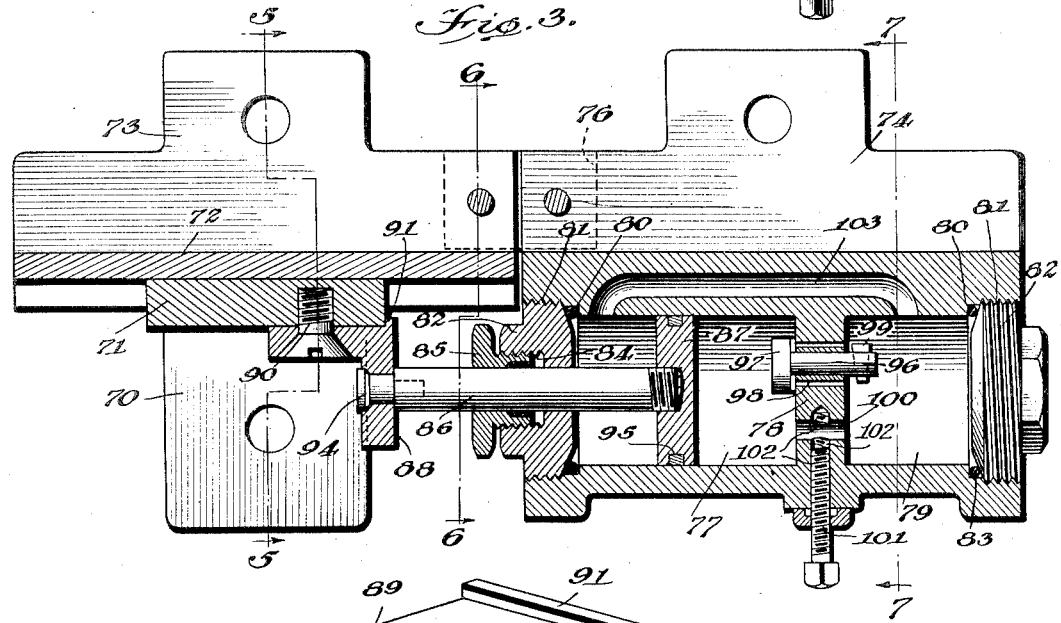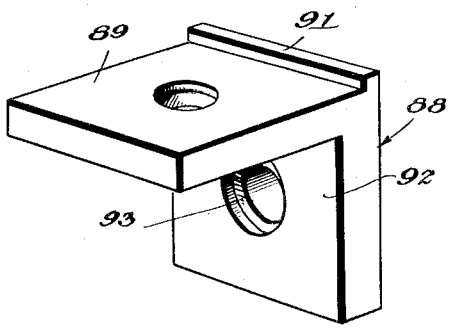

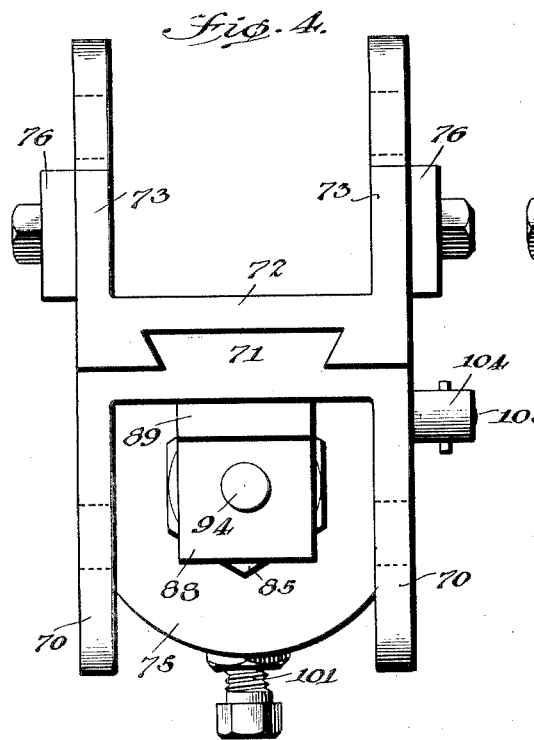
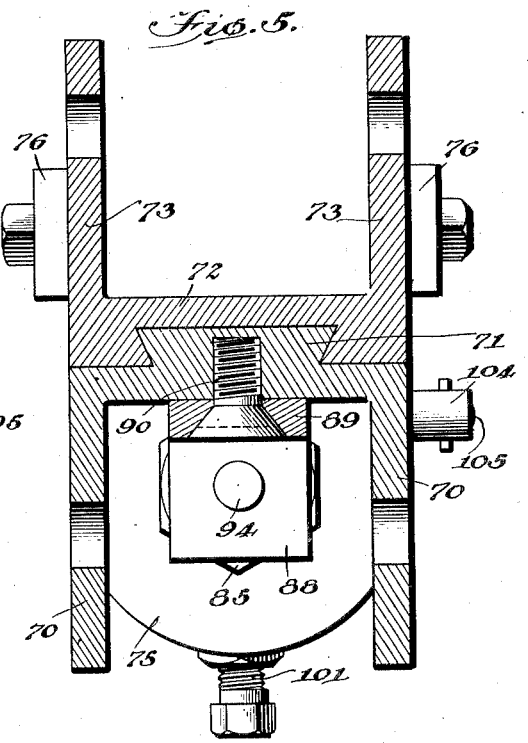
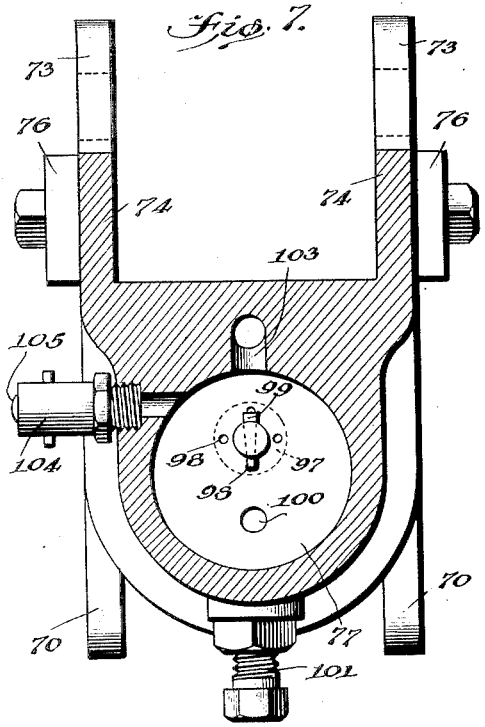
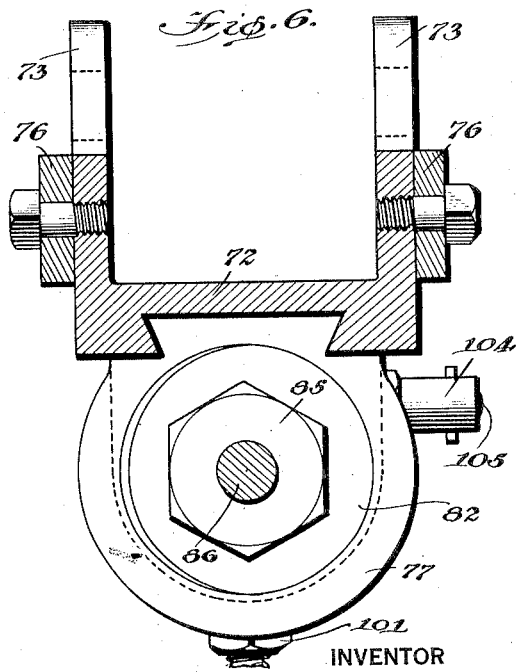

March 31, 1931.  J. W. GRAY  1,799,013
SHOCK ABSORBER MECHANISM
Filed Oct. 16, 1928   6 Sheets-Sheet 4
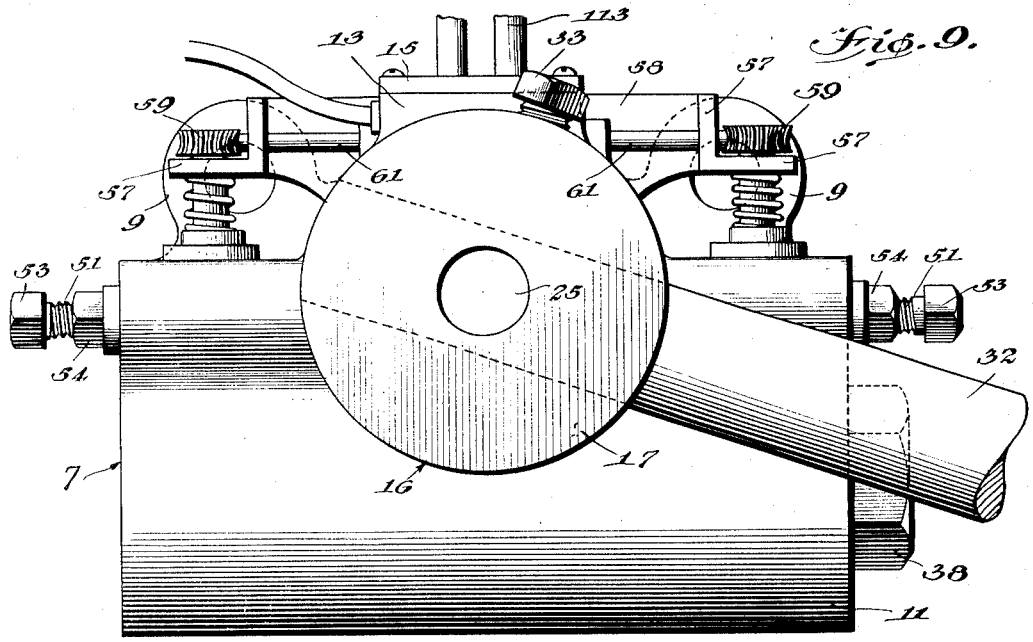
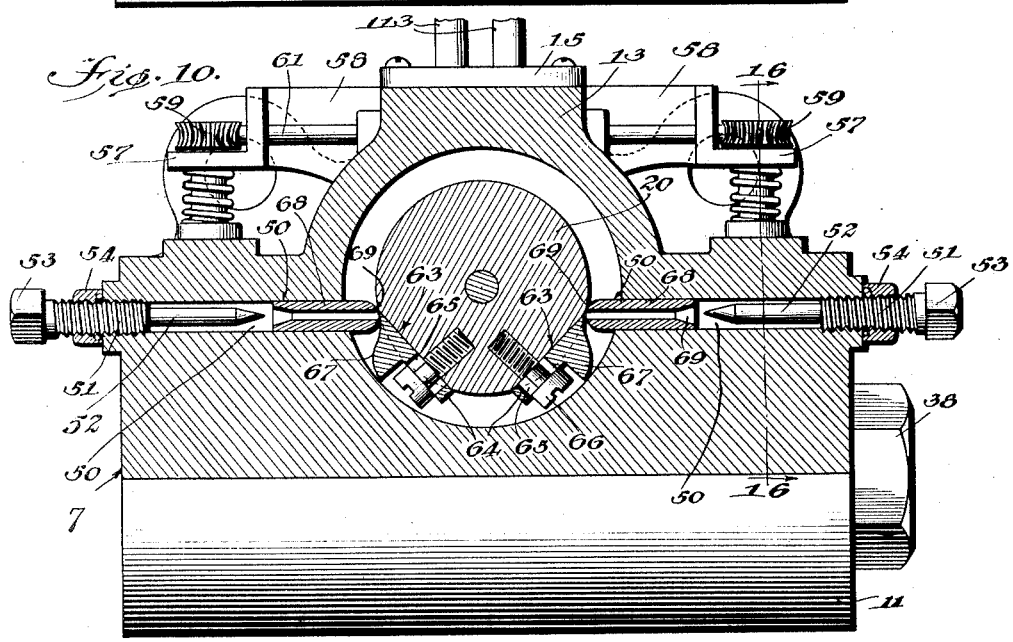
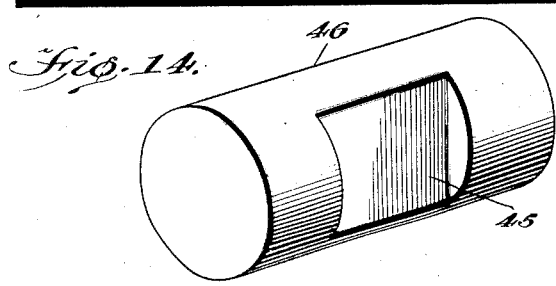
INVENTOR
J. W. Gray
BY
ATTORNEY March 31, 1931.  J. W. GRAY  1,799,013
SHOCK ABSORBER MECHANISM
Filed Oct. 16, 1928   6 Sheets-Sheet 5
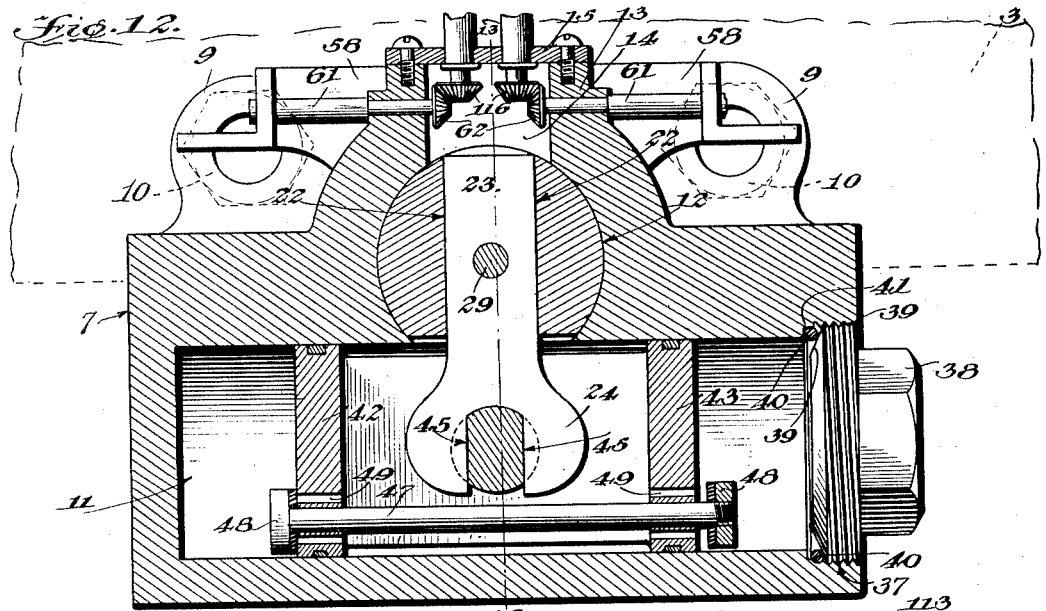
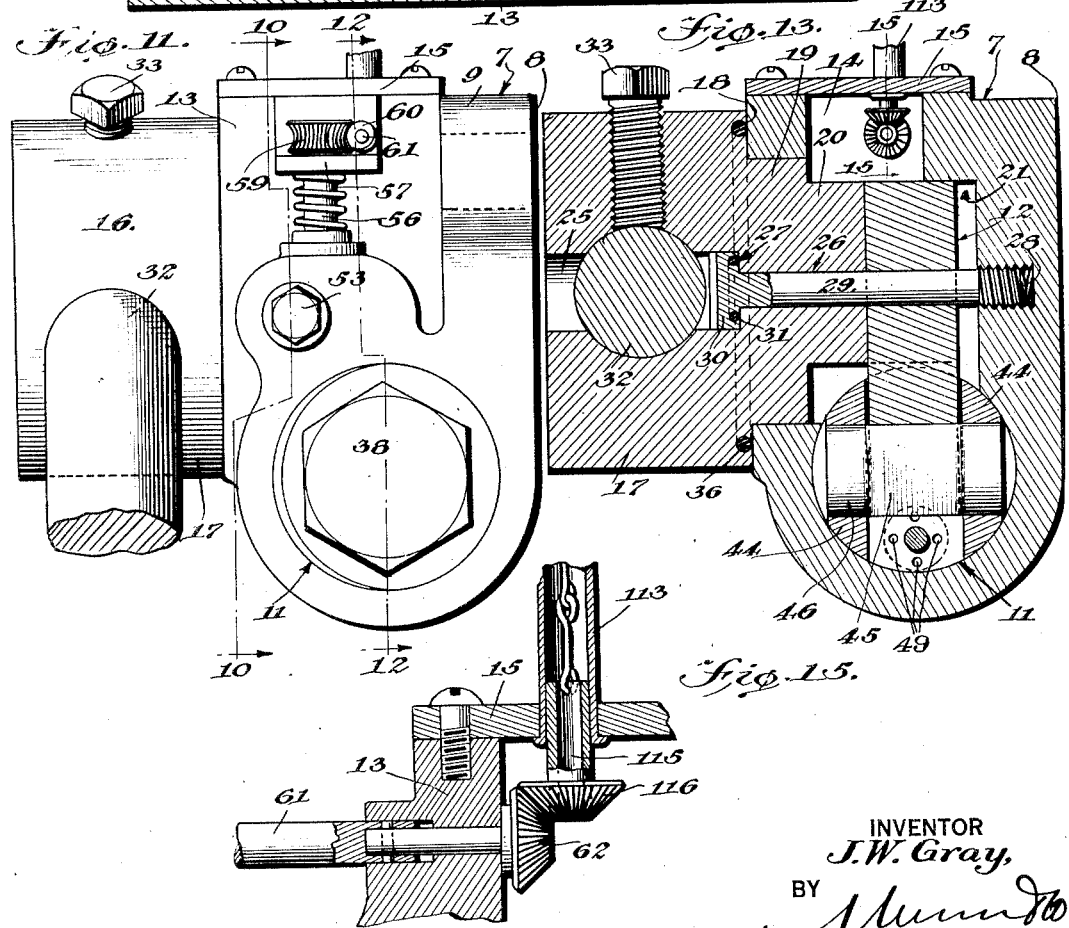
INVENTOR
J. W. Gray,
BY
ATTORNEY

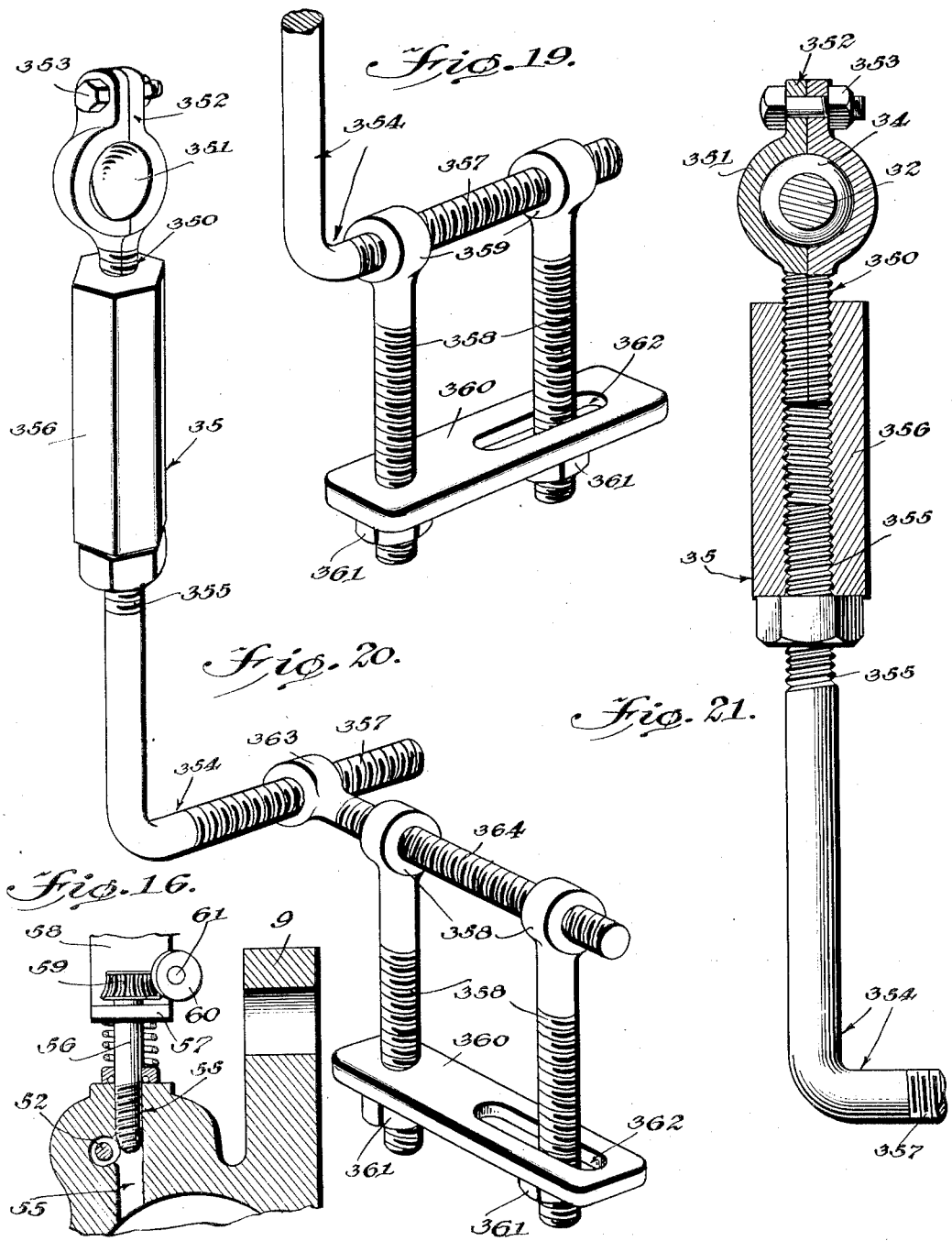

Patented Mar. 31, 1931

1,799,013

REISSUED

UNITED STATES PATENT OFFICE

JOHN W. GRAY, OF CHATTANOOGA, TENNESSEE, ASSIGNOR OF ONE-HALF TO BERNARD V. CURNEN, OF CHATTANOOGA, TENNESSEE

SHOCK-ABSORBER MECHANISM

Application filed October 16, 1928. Serial No. 312,847.

This invention relates to shock absorbing equipment which will be most commonly used on and is therefore best illustrated in connection with motor vehicles, but which is applicable in principle to shock absorbing purposes generally. The invention is more particularly concerned with a fluid-type of shock absorbing equipment embodying novel features of adjustment and compensation and applicable generally to standard constructions of vehicles.

Shock absorbers are used generally to damp or cushion the vertical swing of a vehicle body due to shocks caused by impact of the wheels in depressions or elevations in the roadway. The amplitude of movement imparted to the running gear varies with the violence or force of the shock and the applied retarding or damping force applied through the shock absorber should be varied proportionately.

Accordingly one feature of the invention consists of a fluid shock absorber mounted upon the body frame, chassis, or other one of two relatively movable parts embodying a fluid holding cylinder and a piston reciprocated therein by relative movement of said parts such as the body and axle of a motor vehicle and having means offering progressively increasing resistance to said relative movement proportioned to its amplitude or, in other words, graduated automatically in proportion to the force of the shock imparted as to the wheels of a motor vehicle by depression or elevation in the roadway.

This feature, in accordance with my invention, is secured by progressively restricting the size of a passage through which the fluid is forced by movement of the piston, automatically and in proportion to the extent or amplitude of relative vertical movement of vehicle body and axle. A rotor member actuating the piston and having a crank and lever connection to the vehicle axle is turned in proportion to the relative movement of body and axle, the degree of rotary movement imparted to said rotor member determining the extent of piston movement and functioning also to progressively restrict the fluid passage so that the damping action afforded by restriction of the fluid passage is directly proportioned to the relative movement of body and axle and the force or violence of the shock.

Since the spring suspension and weights of vehicle bodies have a direct bearing upon the amplitudes of shock imparted by relative movement of vehicle body and axle, it is highly desirable that provision be made for adjustment of the damping action of the shock absorbing equipment to make one size of equipment adaptable to widely varying sizes and weights of vehicle body and the accompanying differences in spring suspensions.

Accordingly, a further feature of my invention consists of a fluid cylinder and piston for mounting upon the frame or chassis of a vehicle body, a rotor having crank and lever connection with the vehicle axle for imparting reciprocating movement to the piston, a by-pass or fluid return passage connecting the cylinder at opposite ends of the piston travel, a primary valve for variably and predeterminately restricting the passage of fluid through an initial portion of the by-pass and a secondary valve equipment comprising a needle valve having provision for initial determinate fixed adjustment and a cooperating rotor-actuated tubular valve member cooperating therewith progressively and automatically to restrict the fluid passage and increase the damping action with increase in the extent or amplitude of relative movement of body and axle. The damping action is therefore made automatically proportionate to the force or violence of the shock which force is proportionately reflected in the amplitude of reactionary relative movement of body and axle. In addition to the foregoing, the rotor actuated element producing movement of the tubular valve member has provision for initial adjustment so that with the three points of adjustment thus provided, the shock absorbing equipment is conditioned for initial adjustment for and adaptation to a very wide range of body sizes and weights, spring suspensions, etc.

A further and related feature of the invention consists in the provision of duplex shock absorbing equipment of the type described for damping both up and down movements and in the provision of independent separate adjustments as described making it possible to independently adjust for both of these movements. The initial downward body movement may, therefore, be gradually damped to lessen the violence of impact and the rebound more sharply checked by adjustment for increased damping resistance.

Another feature of the invention consists in shock absorbing equipment including shock absorbing means providing for damped end or lengthwise play of the vehicle spring to reduce the violence of initial impact or shock in combination with shock absorbing means for damping the subsequent relative up and down movement of vehicle body and axle. In the forward movement of a vehicle over a roadway, an elevation or obstruction in the roadway produces a blow or impact having an initial component of force lengthwise rearwardly of the vehicle and an immediately subsequent force vertically. By shock absorbing means providing for and damping end play of the spring, this initial impact is greatly softened and the subsequent relative vertical movement of body and axle is correspondingly reduced and more easily controlled by a second and shock absorbing means having provision for damping this relative vertical movement.

The shock absorbing equipment of motor vehicles as installed is designed or adjusted to provide for a determinate load—usually a full load of passengers or the weight capacity of a truck. The maximum benefit of the equipment is therefore, only obtained by adjusting its damping action to the load. This adjustment, with present day equipment requires usually a visit to a service station and the services of an experienced specialist.

Another feature of the present invention consists in the combination with shock absorbing equipment having a fluid cylinder secured to the frame or chassis of the body and provided with a fluid passage and a passage restricting valve member, of an adjusting means for said valve member projecting from the cylinder and a manually operable adjusting member therefor positioned upon the vehicle body for convenient operation by a vehicle driver or passenger and having operating connections extending below said body to the projecting adjusting means for the valve member. Such an arrangement provides for convenient and quickly effected adjustment of the shock absorber to the load requirements and for unusual road conditions and permits the maximum benefits of shock absorbing equipment to be utilized without loss of time and continual labor expense.

Conveniently and as a related feature, the adjusting means may be combined with a fluid reservoir and liquid filling tubes by means of which an adequate supply of liquid fluid may be maintained in the shock absorber cylinder by automatically replenishing any liquid when the normal full supply is reduced by leakage, contraction, evaporation or other causes. As shown, this result is attained by the provision of a flexible tube through which a flexible adjusting element, such as a chain, extends to the valve adjusting member, the upper end of the chain extending to a rotatable adjusting stud mounted on a liquid container through which the upper end of the tube extends and is perforated to admit liquid thereto, the lower end of the tube communicating with the interior of the shock absorber cylinder. The number of adjusting chains and tubes will, obviously, depend upon the number of cylinders to which the adjusting chains and tubes are to extend.

The structural embodiments providing the above described features and advantages are more fully described in the following detailed specification which is to be read in conjunction with the accompanying drawings forming part thereof and in which:—

Figure 1 is a view in side elevation of the front end of a motor vehicle chassis showing frame mounted shock absorber equipment constructed in accordance with the present invention and connected with a spring end for damping end play and connected with the vehicle spring for damping relative vertical movement of body and axle, the adjustment and filling connections to a dash mounted fluid reservoir and adjustment box being also shown.

Figure 2 is a view in side elevation of the spring end slide mount and connected damping shock absorber.

Figure 3 is a longitudinal section through the mount and shock absorber of Figure 2.

Figure 4 is a view in end elevation of said spring mount and shock absorber.

Figure 5 is a vertical section through the spring mount taken on line 5—5 of Figure 3.

Figure 6 is a vertical section taken on line 6—6 of Figure 3 through the connections between the spring mount and shock absorbing cylinder.

Figure 7 is a vertical section through the shock absorber cylinder taken on line 7—7 of Figure 3.

Figure 8 is a detail perspective of the plate connecting the piston rod with the sliding spring end mount.

Figure 9 is a view in side elevation of the central shock absorber connecting the chassis or body frame and the axle.

Figure 10 is a longitudinal vertical section through the central absorber taken on line 10—10 of Figure 11.

Figure 11 is an end elevation of said central absorber.

Figure 12 is a longitudinal transverse section therethrough taken on line 12—12 of Figure 11.

Figure 13 is a transverse vertical section through the cylinder and rotor of said absorber, taken on line 13—13 of Figure 12.

Figure 14 is a perspective detail of the piston wrist pin to which the rotor is connected for reciprocation of the piston.

Figure 15 is a fragmentary vertical section through the adjusting gearing and fluid supply tube taken on line 15—15 of Figure 13.

Figure 16 is a fragmentary vertical section through the liquid return passage or by-pass of the cylinder taken on the line 16—16 of Figure 10.

Figure 17 is a longitudinal vertical section through the dash reservoir and adjustment box shown in Fig. 1.

Figure 18 is a transverse vertical section taken on the line 18—18 of Figure 17.

Figure 19 is a detail of the lower end of the ball joint lever shown connecting the central shock absorber rotor crank arm with the spring in Figure 1 showing its clamp connection for the spring.

Figure 20 is a full detail of said joint lever with clamp connections at its lower end adapting it to embrace the axle.

Figure 21 is a longitudinal vertical section through the joint lever only showing its adjustment provisions.

The shock absorbing equipment of the present invention, while specifically designed for application to motor vehicles and described and illustrated as used for this purpose, is applicable in principle to relatively movable parts where similar conditions and needs of damping occur.

In the use of the shock absorbing means with motor vehicles, it is preferable to apply the equipment to the vehicle at the four points of spring suspension for uniform results, although as is frequently done, the shock absorbing means may be applied to one end only of the vehicle.

In Figure 1 of the drawings, I have illustrated the application of one unit of the shock absorbing means to a motor vehicle at one side of its front end between chassis and wheel, the front axle being indicated at 1, the opposite front wheel at 2, the chassis or vehicle frame at 3, and the suspension spring at that side and end of the vehicle at 4, this spring being attached intermediate of its ends to the front axle 1 by the usual spring clips 5 and being hung at its front end from the frame 3 in the usual manner as by the usual connection 6. A cylinder block designated generically at 7 and shown in detail in Figures 9–15, is attached to the outer face of the frame 3 above the axle 1, and, as shown in Figure 1, slightly rearwardly of the axle. This cylinder block as best seen in Figures 11 and 12, is mounted upon the outer face of the frame 3 and is provided with a flat rear face 8 (Figures 11 and 13) to engage the outer face of the frame and formed at its ends with ears 9 perforated to receive securing bolts 10 extending through the ears into the frame 3 and by means of which the cylinder block is supported from the frame. The lower portion of this block is formed with a cylinder bore 11 therein and is counter-bored at right angles to form a rotor bore 12 substantially centrally above the cylinder bore and communicating therewith at its base, this last named bore providing a fluid well as will be seen later. Between the ears 9, and inwardly thereof, the cylinder block is formed with a vertical enlargement 13 through the lower portion of which the rotor bore 12 extends, this enlargement having a central vertical bore 14 formed therein extending upwardly from the rotor bore and forming a fluid receiving space, which also houses certain valve adjusting gearing later to be described. The open top of the extension 13 through which the bore 14 extends is closed by a cover plate 15.

A rotor 16 having an external head 17 providing an inner bearing face 18 extends into the bore 12. This rotor member inwardly of its head 17 is reduced in diameter to provide a bearing hub portion 19 engaging and bearing upon the surface of the block at the edges of the bore 12, and with a shank portion 20 which is further reduced in diameter and seats within the socket 21 at the inner end of the rotor bore 12 (see Figure 13). The extremity of the inner end 20 of the rotor is formed with a vertically extending slot 22 to receive the upper end of the shank 23 of a piston operating bar, the lower end of which is enlarged at 24 and bifurcated. The enlarged head 17 of the rotor is formed with an axial bore 25 reduced in diameter from its bearing hub portion and continuing through the rotor as a bore 26 of reduced diameter, the junction of the bore 26 with the outer portion 25 of the bore providing the shoulder 27. In axial alinement with the bore, the rear wall of the cylinder block is formed with a threaded socket 28 of corresponding diameter. The rotor is held in position in the bore 12 of the cylinder block by means of a stud 29 extending through the bore 26 and having its threaded inner end engaged in the threaded socket 28. The head 30 of the stud abuts the annular shoulder 27 of the pin bore and is formed on its inner face with an annular recess in which a compressible packing ring 31 is seated. The head of the pin is preferably slotted to permit its threaded end to be threadedly engaged with the socket 28 by means of a suitable tool, such as a screw driver, inserted through the bore 25 in the rotor head. This head is counter-bored to receive an operating crank arm 32 secured in adjusted position in the head by means of the set screw 33 tapped through the head and engaging the crank arm, this crank arm being inserted, obviously, after the pin 29 has been screwed into place to secure the rotor in the cylinder block.

The outer end of the crank arm 32 is formed or provided with a ball end 34 seating in a socket formed in the upper end of a lever member, generically indicated at 35, which extends upwardly from the spring or axle. This lever member, as seen in Figures 20 and 21, is provided at its upper end with a threaded stem 350 having at its upper end a cupped portion 351 for the ball end 34 and an end lug 352. The stem is made in two complemental sections by splitting longitudinally on its median line, the sections of the lug 352 having alined threaded bores formed thereon to receive a clamping screw 353 by means of which the cupped portion 351 is clamped over the ball end 34 to provide a ball joint therewith. A lower L-shaped stem 354 has its vertical threaded upper end 355 adjustably coupled to the lower threaded end of the split stem 350 by an internally threaded coupling sleeve 356. A lock nut holds the end 355 in its adjusted position in the sleeve.

Provision is made whereby the lower horizontal threaded end 357 of the stem 354 may be clamped either to the longitudinal spring or to the axle of the vehicle since the construction of different motor vehicle chassis vary and it may with some constructions be necessary to anchor the lower end of the lever member 35 to the axle in the installation of the shock absorber thereon.

In Figure 19, the anchoring clamp for the spring is shown. The lower horizontal arm 357 of the L stem is utilized as the top member of the clamp. Internally threaded eyes 359 at the upper ends of eye bolts 358 are threaded on the horizontal stem arm 357 and their lower threaded ends are then inserted through a bore and slot (362) in a bottom clamping plate 360 which will underlie the spring and be clamped thereto by nuts 361 threaded on the lower projecting ends of the eye bolts. The slot 362 permits the eye bolts to be spaced to the width of the spring.

In Figure 20, the clamping bracket is offset at a right or other necessary angle to the horizonal threaded lower arm 357 of the L stem by a third eye bolt whose threaded eye 363 is threaded on the horizontal stem 357 and whose threaded shank 364 is made to constitute the upper plate of an axle embracing clamp, this shank having the eyes 358 of the first mentioned pair of eye bolts 358 threaded thereon and coupled to the bottom clamping plate 360 as previously described. The additional eye bolt 363—364, therefore, is all that is necessary to anchor the lower end of the lever member to the axle. The various adjustments provided by the threaded elements and the clamp plate slot therefore make this equipment adaptable to all practical conditions of installation.

In order to effect a fluid tight connection between the rotor head 17 and the side of the cylinder block against which its under face bears, the head 17 similarly to the head 30 of the rotor securing pin is formed with an annular recess in its face in which is seated a packing ring 36 of circular cross section and compressible material which is drawn into fluid tight engagement with the sides of the cylinder block through the action of the fastener pin 29.

One end of the cylinder bore 11, which may be drilled in the casting, is annularly enlarged and internally threaded at 37 and is closed by a screw plug 38 having a beveled inner edge 39 engaging and forcing a ring of compressible packing 40 against the shoulder 41 formed by the annular threaded enlargement 37 thereby providing means for effecting a fluid tight closure for the end of the cylinder bore. Mounted in this bore in spaced relation are pistons 42, 43 joined by side walls 44 externally curved to engage and guide upon the walls of the bore 11 and providing a fluid reservoir between the pistons open at the top and bottom and communicating with the fluid well in the rotor bore 12. The shank 23 of the depending rotor bar extends down through the opening between the upper ends of the side walls 44 and embraces with its bifurcated lower end 24 the intermediate squared sides 45 of a circular wrist pin 46 whose outer ends are journaled in transversely alining bores formed in the side walls 44. It will be obvious that movement of the crank arm 32 upwardly and downwardly with the relatively vertical movement between the axle 1 and frame 3 caused by depressions and elevations in the surface of a roadway will oscillate the rotor, and through the connecting bar 23, effect reciprocation of the duplex pistons 42, 43. These pistons are preferably provided with rings of usual construction in their peripheries insuring a fluid tight fit in the cylinder bore and in longitudinal alinement below the bifurcated end 24 of the connecting arm or rod 23 are bores in alinement to receive a check valve stem 47 extending therethrough and having threaded on its outer ends valve disks 48. Within the area of the pistons engaged between the valve disks are formed an annular series of fluid openings 49. The check valve stem 47 is of greater length than the spacing of the outer ends of the pistons 42, 43 so that it may slide relatively to the duplex connecting pistons and bring one or the other of its valves 48 against the fluid passages 49 to close these passages in the opposite directions of movement of the pistons. In other words when the pistons 42—43 are moved in unison toward the right in Figure 12, the check valve formed by the stem 47 and right hand disk 48 will close and the check valve formed by the other end of the stem 47 and the left hand valve disk 48 will open and vice versa in the usual manner of check valves.

The fluid, such as heavy oil, glycerine, etc. with which the cylinder bore 11 is filled, is forced from one end of the cylinder by movement of the duplex piston toward that end through a fluid return passage leading back to the fluid reservoir between the pistons 42—43. This movement of the fluid is utilized and is restricted to damp the piston movement by similar means at each end of the cylinder block. In line with the shank portion 20 which lies outwardly of its slotted portion 22 housing the connecting rod 23, the cylinder block is provided with alined passages 50 extending in opposite directions from the rotor bore 12 longitudinally of and through the block, the outer ends of these passages being internally threaded to receive the enlarged threaded shanks 51 at the outer ends of needle valves 52 adjusted inwardly and outwardly in the fluid passages 50 to a predetermined fixed point through the bolt heads 53 formed upon the outer ends of these shanks. Lock nuts 54 threading on the shanks 51 preferably have their under faces recessed to receive packing rings engaging bosses formed on the block at the outer ends of the fluid passages 50. These passages extend parallel with the axis of the cylinder bore 11 and communicate therewith through vertical fluid passages 55 extending at right angles and substantially tangentially to the bore, and through the upper side of the cylinder block. These passages 55 are threaded and receive the threaded shanks 56 (Figure 16) of passage restricting valve members which extend freely through angled brackets 57 joined by webs 58 to the enlargement 13 of the cylinder. The upper ends of the threaded shanks 56 have fixed thereon worms 59 meshing with worm gears 60 (Figure 11) mounted upon the outer ends of countershafts 61 which extend through and journal in the vertical arms of the brackets 57 (Figures 9 and 10) with their inner ends extending through and journaling in the sides of the enlargement 13 of the cylinder block. The inner ends of the counter-shafts 61 mount bevelled gears 62 which are rotated through dash adjusting means which will be hereinafter described and operate through motion imparted by the counter-shafts 61, worm gears 60 and worms 59 to raise or lower the threaded valve stems 56 to cause their lower ends variably and predeterminately to restrict the openings joining the longitudinal fluid passages 50 with the vertical fluid passages 55. The stem valves 56 are intended to provide means for initially restricting the by-pass or return fluid passage connecting the cylinder bores at the opposite ends of the cylinder and of the travel of the pistons therein with the fluid reservoir between the pistons through the rotor well with which the longitudinal bores 50 communicate.

In addition to the damping action upon the piston stroke provided by this initial restriction of the fluid passage between the cylinder ends and the fluid return reservoir between the pistons, I have provided means actuated by movement of the rotor shank 20 for further and progressively restricting the fluid passage in proportion to the degree of movement of the crank arm 32 and the rotor 20, this degree or amplitude of movement being directly proportioned to the relative vertical movement of the vehicle axle and frame, which in turn is proportioned to the shock produced by the wheels of the vehicle encountering an elevation, depression, or other obstruction in the roadway.

Accordingly, and referring more particular to Figure 10, it will be seen that the portion 20 of the rotor alining with the fluid passage 50 is provided with substantially adjacent flattened peripheral faces 63 at the lower side of the rotor portion 20. Seating upon these flattened portions are plates 64 having longitudinal slots 65 therein for adjustment of the plates circumferentially of the rotor portion 20. Adjusting screws 66 have their shanks extending through the slots in these plates and tapped into bores extending angularly into the rotor portion 20, the heads of these bolts overlying the sides of the slots in the plates and clamping them on their seats on the rotor. The upper ends of these plates, as viewed in Figure 10, are formed with curved outer faces presenting cams 67 curving outwardly from the periphery of the rotor 20 toward the outer wall of the rotor well and terminating within the area of the well to permit oscillation of the rotor. Cooperating with these cams are tubular valve members 68 slidably fitting in the fluid passages 50 and having rounded inner ends 69 making a line contact with the cams 67. These tubular valve members extend a substantial distance in the fluid passages 50 and have their bores formed with outwardly flaring outer ends 69 which cooperate with the tapered or conical ends of the needle valves 52, previously described, which form, in effect, valve seats and cooperate with the flaring outer ends 69 to restrict further the fluid passage. This action will be clearly seen from the showing in Figure 10 from which it follows that oscillation of the rotor 20 upwardly to the right as viewed in that figure will cause the cam 67 to engage the rounded inner end 69 of the tubular valve member 68 at the right side and force it progressively outwardly toward the right, bringing its flared outer end toward and over the conical end of the needle valve 52 and progressively restricting the fluid passage through its bore as the pointed end of the needle valve enters more and more into the flared end of the bore of said tubular member. These tubular valve members 68 have a snug sliding fit in the passages 50 so that fluid is compelled to pass through the central bores of the tubular members in order to reach the fluid well formed within the rotor bore 12 between the walls of the bore and the periphery of the portion 20 of the rotor. The point at which the tubular members begin to restrict the passage of fluid from the ends of the cylinder bore through the passages 50 may be predeterminately varied by adjustment of the needle valves 52 through their projecting outer ends 53.

Movement of the piston 42—43 toward the right, for example, occurs upon the initial downward movement of the frame 3 relatively to the axle 1 due to the initial compression of the suspension spring 4 by road shock. Reverse movement or rebound swings the piston 42—43 to the left as viewed in Figure 12. Since the adjustments of the restricting valves 56 and 52 and of the cam plates 64 are independent, the damping action afforded by restriction of the fluid passages 50—55 may be made different for the rebound stroke from those provided for the initial downward movement. Three points of adjustment are provided, therefore, for each of the two opposite and relatively vertical movements of the body and axle. The adjustable mounting of the crank arm 32 in the head 17 of the rotor through set screw 33 permits one size and form of shock absorber cylinder to be adapted to different sizes and forms of vehicle bodies. The device, of course, can be manufactured in a standardized form for one particular vehicle chassis and with the crank arm fixed to the rotor and the adjustment omitted. In such an instance, the rotor and crank arm can be formed as a single integral member with the mass of the rotor head 17 reduced.

The shock absorbing device heretofore described provides for damping the relatively vertical movements between the frame and axle of the vehicle. It is highly desirable in connection with this damping action to reduce the initial shock imparted by contact of the road wheels with an obstruction, which shock imparts a lengthwise component of movement or thrust through the axle to the springs and through the springs to the body. This result, in accordance with the present invention, is secured by mounting one end of the suspension spring for sliding movement lengthwise of the frame. As shown in Figure 1, the rear end of the suspension spring is so mounted since the lengthwise component relative movement produced by the initial impact of the road wheels with an obstruction has a tendency to swing the suspension spring rearwardly on its hangers as well as move it vertically toward the body, resulting in the lowering of the body and frame toward the axle. This end of the suspension spring, as shown, is mounted for substantially unrestricted lengthwise movement, the return movement or rebound being restricted. The sharpness of the initial impact of shock is thereby reduced by the longitudinal yielding of the spring end and severe recoil upon rebound is prevented by the damping means associated with this end of the spring which I will now describe and which is shown in detail in Figures 2–8 of the drawings. By reference to Figure 1, it will be seen that the usual spring shackle at the rear end of the suspension spring 4 is omitted, and that this end of the spring is pivotally hung between the depending side plates 70 of a carrier or mount whose upper plate 71 is dove-tailed into a longitudinally extending dove-tailed recess in the under face of the bottom plate 72 of a U-shaped bracket 73 embracing the sides of and bolted through the frame 3 of the vehicle or chassis. Adjacent to the brackets 73, the frame is embraced by plates 74 upstanding from the top of and preferably cast integral with a damping cylinder block 75 which is secured to and supported from the frame by means of bolts connecting the plates 74 and extending through the frame 3. Preferably the abutting frame embracing plates 73—74 are interjoined by connector plates 76 bolted to and overlying their abutting edges.

The cylinder block 75 below its suspending plate 74 is provided with a cylinder bore 77 therein extending longitudinally of and for a part of the length of the block and separated by a partition 78 from an axially alined liquid reservoir 79. These two alined compartments, as shown, are formed by counter-boring the cylinder block at opposite ends in axial alinement, the inner ends of the bores being separated by the partition 78 and the outer ends being formed with annular shoulders 80 and adjoining internally threaded outer ends 81 of enlarged diameter closed by threaded plugs 82 having bevelled inner edges engaging and pressing rounded packing rings 83 into fluid tight engagement with the shoulders 80. The screw plug 82 at the outer end of the cylinder bore 77 is formed with an internally threaded central socket 84 receiving a packing gland 85 through which the piston rod 86 attached to piston 87 in the cylinder bore extends outwardly from the cylinder. The outer end of the piston rod 86 is formed with a tapped socket therein and is secured to the upper plate 71 of the spring end mount 70 as follows:

An angle block 88 (Figures 3 and 8) has its upper horizontal portion 89 seated against the underface of the plate 71 at one end thereof and secured thereto by suitable means such as the machine screw 90. At its edge, the horizontal portion 89 is provided with a ledge 91 extending above the edge of the upper plate 71 at its end so that the angle block is firmly secured to the upper plate of the sliding spring carrier. The vertical plate 92 of the angle block has a bore 93 formed therein through which the shank of a headed locking pin 94 extends with its end threaded through and into engagement with the threaded socket formed in the outer end of the piston rod 86, thereby securing the end of the piston rod with the angle block secured to and moving with the sliding mount 70—71 for the end of the spring 4.

The piston 87 in the damping cylinder bore 77 is preferably provided with one or more piston rings 95. Liquid is drawn from the reservoir 79 into the cylinder bore 77 by outward movement of the piston 87 to the left, as viewed in Figure 3 through an outwardly opening check valve having a stem 96 guided through a bore in the partition 78 and a valve head 97 overlying an annular series of fluid passages 98. The end of the stem 96 within the reservoir 79 is provided with a cross pin 99 serving to retain the stem within the reservoir, while permitting limited movement of the stem toward the left to remove its head 97 from the passages 98 and permitting fluid to be drawn therethrough by movement of the piston 87 toward the left. Liquid is also drawn by such movement of the piston through a fluid passage 100 traversing the partition 78 below the check valve 97. This last named fluid passage is restricted by a needle valve 101 extending from the exterior of the cylinder block at its bottom upwardly through a counter-bore 102 in the block traversing the fluid passage 100 and terminating in the partition 78 above said fluid passage. The end of the needle valve extends, as shown, to the exterior over and below the cylinder block 75 and is headed for manually effected adjustment predeterminately to limit the restriction of the passage 100. The outer end of the cylinder bore 77 and the fluid reservoir 79 are connected for the return passage of fluid on the opposite direction of movement of the piston 87 by a by-pass 103 cored in the cylinder block.

Outward movement of the slidably mounted end of the suspension spring 4 operating through its carrier 70—71 will therefore tend to move the piston 87 to the left as viewed in Figure 3. This movement is substantially unrestricted since the check valve 97 will be drawn outwardly to the left freely permitting fluid to be drawn through its ports or passages 98 and also through the restrictable fluid passage 100. Upon the rebound of the spring and reverse sliding movement of the piston 87 closes the check valve and the fluid ahead of the piston passes through the restricted passage 100 damping or slowing down the piston movement and thereby damping the rebound or return sliding movement of the spring end. The adjustment of the needle valve 101 thus provides a seventh point of adjustment control for the shock absorbing equipment for the spring suspended end of the vehicle as shown in Figure 1.

In the passage of a vehicle so equipped over very rough roadways, the piston 87 will receive many successive short reciprocations in which the cubic contents of the cylinder and its communicating bores will be varied due to the entry and exit of the piston rod. I have provided means for compensating by air ingress and egress, this variability of cubic contents by means of a filling plug 104 inserted through a bore in the side of the cylinder to communicate with the interior of the reservoir 79 and mounting a spring pressed ball valve 105 at its outer end. This plug, in construction, corresponds to the well known ball-valved lubricant insertion nipple or fitting used upon bearings of motor vehicles and its ball valve will pulsate in response to suction and pressure creating variations in the cubic contents in the bores 77—79 permitting air to be drawn in and forced out in compensation therefor and seating and retaining within the reservoir, the relatively heavy oil of which there will be practically no leakage. The fitting may be also used in connection with the well known lubricant filled pressure pump or "gun" for forcing oil into the cylinder reservoir in initially supplying oil thereto.

It will be realized that shock absorbing equipment such as described is initially adjusted for average load and road conditions when installed upon a motor vehicle. To secure the maximum benefits of the equipment for varying conditions of roadway, variation in adjustment is required. This change in adjustment as ordinarily effected at a service station is impractical in travelling over the road. I have provided means, however, which is readily operated by the driver as from the dash, by means of which the restriction of a fluid passage and the damping or shock absorbing action resulting therefrom may be varied almost instantly to suit road conditions as encountered and conveniently be combined with the adjusting means. A liquid reservoir and filling system for maintaining the cylinders filled with fluid and therefore fully effective at all times, is conveniently mounted upon the vehicle, as shown. The dash 106 (Figure 1) mounts a combined valve adjusting and cylinder filling box 107 shown in detail in Figures 17 and 18. This box is preferably provided with a removable cover 108 and with a positioning partition plate 109 fixedly secured to its interior and spaced from its bottom. This plate, the cover of the box, and its bottom are provided with a series of longitudinally extending vertically alined holes through which extend a series of vertical filling and valve adjusting tubes 110, the upper ends of which are formed for manual turning adjustment and project above the top of the cover. Above the partition 109, the tubes have a series of oil openings 111 therein and are supported in determinate vertical position within the box by means of cotter pins 112 inserted therethrough above the top of the partition 109. The openings in the bottom of the reservoir box 107 are made of greater diameter than the tubes 110 to receive the ends of flexible tubes 113 which extend into the box 107 and are flanged to seat thereover. These tubes depend from the box 107 through the floor of the vehicle body and extend through the top cover plates 15 of the shock absorber cylinder blocks 7. They are used to convey the fluid from the reservoir 107 into the fluid receiving chamber at the top of the cylinder block, previously described, and also to house motion transmitting chains or cables 114 secured to the lower end of the adjusting tubes 110 which extend down within the upper ends of the flexible tubes 113. These adjusting chains, as shown in detail in Figure 15, extend to the lower ends of the tubes 113 and are coupled to the upper end of tubular shafts 115 whose shanks are journalled in the lower ends of the flexible tubes 113 and whose lower ends are provided with bevelled gears 116 meshing with the bevelled gears 62 on the countershafts 61. The oil or other fluid from the combined valve adjusting and cylinder filling box 107 will flow by gravity through the tubes 113 into the fluid receiving chamber of the cylinder blocks and through the fluid well in the rotor bore to the cylinder to maintain a full supply of fluid therein at all times. Since the pair of valve stems 56 in cylinder block 7 controlling the relative vertical movement of the axle and frame are independently adjustable, two tubes 113 and two chains 114 are used for each cylinder unit. Adjustment of a dash control tube 113 will, through the chain 114, pairs of beveled gears 62 and worm gear 59, 60, rotate the stems of the needle valves 56 at one or the other end of the cylinder to vary its fluid passage restricting position and thereby vary the damping action of the shock absorber for upthrust as required by the particular condition of the road being traversed or by a change in the load on the vehicle so that the damping or shock absorbing action provided by the double acting shock absorbers 7 may be almost instantly varied to suit the temporary requirements of travel and road conditions. The fluid reservoir box 107 is used also to maintain the level of fluid in the damping cylinder 75 for the end of the suspension spring. Conveniently, the by-pass 103 in the cylinder is tapped to receive a flexible tubular conduit 117 extending therefrom and inserted at its other end into the liquid receiving space 14 at the top of the cylinder block 7 beneath its cover plate 15. The liquid fed thereto through the flexible conduits 113 will therefore flow from the space 14 through the conduit 117 to the by-pass 103 of the spring end damping cylinder and maintain this cylinder also filled with damping fluid.

The operation of the shock absorbing equipment described therein is believed to have been clearly stated in the foregoing and need not be recapitulated here in detail. It might be stated that the tubular valve members 68, best seen in Figure 10, require no means for forcing them against the cams 67 other than the pressure of the fluid forced by the pistons 42—43 through passages 55 and 50 thereagainst, this pressure serving to maintain the rounded ends 69 of the tubular valve members in contact with the cams 67 at all times.

The specific embodiment of the invention and its structural details as disclosed herein represents a preferable form, illustrative of the invention but not intended as restrictive thereof. This form is subject to modification and adaptation to suit varying conditions of manufacture and application within the spirit of the invention and the scope of the appended claims.

What I claim, therefore, and desire to secure by Letters Patent is:—

1. A shock absorber comprising a cylinder block mounted upon one of two relatively movable parts, a piston mounted in said cylinder block for reciprocation, a fluid passage communicating with the cylinder block at opposite ends of the travel of said piston, means for reciprocating the piston including a rotor housed in the cylinder block and operatively connected with the piston, a crank arm exteriorly of the cylinder block connected with said rotor and a lever connecting said crank arm with the other of said relatively movable parts, and means for restricting said fluid passage including a seat, a valving element loose and freely movable in said passage toward and from said seat, and an actuator therefor movable through and proportionately to relative movement of said parts to engage and position said element relatively to said seat progressively and increasingly to restrict and reversely to enlarge said fluid passage in proportion to the amplitude of relative movement of said parts, said element being maintained in positioned contact with said actuator through skin friction of fluid thereagainst.

2. A shock absorber comprising a cylinder block mounted upon one of two relatively movable parts, a piston mounted in said cylinder block for reciprocation, a fluid passage communicating with the cylinder block at opposite ends of the travel of said piston, means for reciprocating the piston including a rotor housed in the cylinder block and operatively connected with the piston, a crank arm exteriorly of the cylinder block connected with said rotor and a lever connecting said crank arm with the other of said relatively movable parts, and means for restricting said fluid passage including a valve seat member adjustably mounted in said passage and a cooperating valve member loose and freely movable in said passage, with means operated through said rotor and effective to engage and automatically to move said valve member toward and from said seat member coincidently with and proportionately to relative movement of said parts variably to restrict said passage in proportion to the amplitude of said relative movement, said valve member being positioned in said passage in advance of said engaging means and being held thereagainst for controlled positioning thereby through the skin friction of pressure fluid passing thereover.

3. A shock absorber comprising a cylinder block mounted upon one of two relatively movable parts, a piston mounted in said cylinder block for reciprocation, a fluid passage communicating with the cylinder block at opposite ends of the travel of said piston, means for reciprocating the piston including a rotor housed in the cylinder block and operatively connected with the piston, a crank arm exteriorly of the cylinder block connected with said rotor and a lever connecting said crank arm with the other of said relatively movable parts, and means for restricting said fluid passage including a predeterminately adjusted member initially restricting said passage and supplemental and subsequent passage restricting means including an element automatically movable by and coincidently with relative movement of said parts and effective progressively and increasingly to restrict said fluid passage in proportion to the amplitude of relative movement of said parts.

4. A shock absorber comprising a cylinder block mounted upon one of two relatively movable parts, a piston mounted in the cylinder block thereof for reciprocation, means for reciprocating the piston including a rotor housed in the cylinder block, a crank arm exteriorly of the cylinder block connected to the rotor and a lever connecting the crank arm and the other of said two relatively movable parts, a fluid by-pass in said block communicating with the cylinder bore at opposite ends of the piston travel therein, a primary passage-restricting valve member having a shank portion extended to the exterior of the block for adjustment and having its inner end positioned by adjustment predeterminately to restrict the initial portion of said passage from one end of the cylinder, and supplemental passage restricting means comprising a movable tubular member seating in said by-pass and an axially alined predeterminately adjusted fixed needle valve cooperating therewith, and means operated by movement of said rotor through relative movement of said two connected parts to move said tubular member toward its fixed needle valve progressively and increasingly to restrict the fluid passage proportionately to the amplitude of movement of said two relatively movable parts.

5. A shock absorber comprising a cylinder block mounted upon one of two relatively movable parts and having a bore therein substantially centrally of and extending at substantially right angles to the axis of the cylinder bore and housing a rotor member providing therewith a fluid well, duplex pistons having oppositely opening check valves therein mounted in said cylinder bore in spaced connected relation for joint reciprocation and spaced to provide a return-fluid reservoir therebetween communicating with the fluid well of said rotor bore, fluid passages extending through the cylinder block connecting the opposite ends of the cylinder bore with the central fluid well, a primary passage restricting valve member extending into the initial portion of each passage and having means extending through the block to its exterior for external adjustment to predeterminately fix the passage-restricting position of the valve member, supplemental restricting means for each fluid passage comprising an adjustably fixed valve stem and a cooperating relatively movable tubular valve seated in said passage, a connection between the rotor and said pistons, an operating crank for the rotor member, a lever connecting said crank with the other of the two relatively movable parts to which the shock absorber is applied and through which rotary movements is imparted to said rotor member by relative movement of said parts in proportion to the amplitude of said relative movement, and means operated by such movement of the rotor progressively to move said tubular valve member toward its fixed valve stem with and in proportion to the amplitude of such relative movement, thereby progressively and increasingly to restrict its fluid passage during such relative movement and in proportion to the shock received and the resultant amplitude of relative movement.

6. In a fluid controlled damping device, a fluid passage having a valve restrictable portion, fluid pressure creating means operative to force fluid through said passage under pressure in one direction, a valve member loose and freely movable in said fluid passage adjacent its restrictable portion and opposed to the flow of fluid therethrough, and a valve activator at the side of said valve member opposed to said restricted portion operative to move said valve member relatively to said restricted portion progressively to vary the restriction of said passage and the resistance to fluid flow therethrough with said valve member maintained in operative relation to said activator by skin friction of the pressure fluid thereagainst.

7. In a fluid controlled damping device, a fluid passage having a restricted portion, a loose freely movable valve member in said passage adjacent to and cooperating with its restricted portion and movable variably to restrict the flow of fluid therethrough, a valve positioning activator engaging said valve member and movable in synchronism with the operation of pressure creating means progressively to vary the restriction of said passage and the resistance to fluid flow therethrough, and fluid pressure creating means operative to force fluid under pressure through said passage in the direction tending by friction thereagainst to move said valve member bodily toward said activator to maintain said valve member in operative positioning contact therewith.

8. In a fluid controlled damping device, a fluid reservoir, a fluid passage connecting opposite sides of said reservoir having a restricted portion, a loose freely movable valve member in said passage adjacent to and cooperating with said restricted portion and movable variably to restrict the flow of pressure fluid through said passage, a valve engaging cam member operative synchronously with and through the operation of pressure creating means to move said valve member progressively to increase and decrease the restriction of said passage and the resistance to fluid flow therethrough, and fluid pressure creating means operative to force fluid under pressure through said passage in the direction tending by friction thereagainst to move said valve member bodily toward said cam member to maintain said valve member in operative positioning contact therewith.

9. A fluid controlled damping device having a fluid passage provided with a restricted portion, a loose freely movable valve in said passage adjacent to and cooperating with said restricted portion and movable variably to restrict the passage of fluid therethrough, a valve engaging member movable to position said valve member progressively to increase and decrease the fluid flow through said restricted portion in proportion to the amplitude of movement of said valve-engaging member, and fluid pressure creating means operative to force fluid under pressure through said passage in the direction tending by friction thereagainst bodily to move and hold said valve member in operative positioning contact with said valve-engaging member.

10. A fluid controlled damping device for damping relative movement between parts having a fluid passage, a loose freely movable valve in said passage opposing the flow of fluid therethrough and cooperating with said passage to increase and decrease the resistance to the flow of fluid therethrough, a cam activator for said valve member movable in synchronism with the operation of pressure creating means and effective to move said valve member progressively to increase and decrease the resistance to flow of fluid through said passage in synchronism with and proportion to the amplitude of cam movement, and fluid pressure creating means operative by relative movement between said parts to force fluid under pressure through said passage in the direction tending by friction thereagainst bodily to move said valve member toward and maintain it in operative positioning contact with said cam member.

JOHN W. GRAY.